United States Patent

Gross

[15] 3,658,193

[45] Apr. 25, 1972

[54] MAGNETIC TAPE CASSETTE CHANGER

[72] Inventor: William J. Gross, Woodland Hills, Calif.

[73] Assignee: Data Instruments Company, Sepulveda, Calif.

[22] Filed: Nov. 21, 1969

[21] Appl. No.: 878,632

[52] U.S. Cl. .........................214/6 D, 179/100.2 Z, 274/4 F, 214/8.5 R

[51] Int. Cl. .........................B65h 1/00

[58] Field of Search ................214/6 D, 6 DK, 6 BA, 6 F, 6 P; 274/4 F; 179/100.2 Z; 353/15; 242/197–200

[56] References Cited

UNITED STATES PATENTS

| | | | |
|---|---|---|---|
| 3,477,726 | 11/1969 | Laschenski | 274/4 F |
| 3,335,699 | 8/1967 | Aiken et al | 214/6.2 X |
| 2,981,420 | 4/1961 | Johnson | 214/6 DK |
| 3,452,884 | 7/1969 | Tanqueray | 214/6 DK UX |
| 3,197,150 | 7/1965 | Camras | 274/4 F |
| 3,291,323 | 12/1966 | Pastor et al | 214/6 BA |

*Primary Examiner*—Gerald M. Forlenza
*Assistant Examiner*—Robert J. Spar
*Attorney*—Spensley & Horn

[57] ABSTRACT

An automatic magnetic tape cassette or magazine changer is disclosed which comprises an input hopper, discharge hopper and a carriage for transporting cassettes onto and from a tape recorder. The input hopper is mounted above the tape recorder and cassettes from the hopper are properly aligned to successively engage the recorder. The carriage provides vertical and horizontal motion to cassettes so that a cassette may be removed from the tape recorder and placed into the discharge hopper, in addition to lowering the next cassette from the input hopper onto the tape recorder.

7 Claims, 7 Drawing Figures

WILLIAM J. GROSS
INVENTORS

BY Spensley & Horn
ATTORNEYS

WILLIAM J. GROSS
INVENTORS

BY
Spensley & Horn
ATTORNEYS

WILLIAM J. GROSS
INVENTORS

BY Spensley & Horn
ATTORNEYS

MAGNETIC TAPE CASSETTE CHANGER

BACKGROUND OF THE INVENTION

1. Field of the Invention

The invention relates to magnetic tape cassette or magazine changers.

2. Prior Art

Magnetic tape cassettes have become quite popular, particularly for use in sound reproduction systems. The cassettes are typically manually loaded into a recorder or playback means and manually removed from said means. The inventor is aware of only one prior art cassette changer. The device is unreliable and not suitable for commercial applications.

SUMMARY OF THE INVENTION

The automatic cassette changer comprises an input hopper, a carriage, a driving mechanism for the carriage and a discharge hopper. The input hopper which has a generally rectangular cross-section and is suitable for containing a plurality of cassettes is positioned above a tape recorder such that cassettes from the hopper may be readily placed, successively, on the recorder. The carriage which contains an elongated tray disposed between a cassette engaging the recorder and the recorder is adaptable for lifting a cassette engaging the recorder vertically from the recorder and moving the cassette horizontally away from the recorder to a position where it will fall into the discharge hopper. A stop means which is positioned adjacent to the input hopper and recorder allows the cassette to move horizontally away from the recorder but prevents the cassette from returning to the recorder. The carriage which is driven by the driving mechanism moves a cassette from the recorder past the stop means. As the carriage moves back towards the recorder, the stop means prevents the cassette from returning to the recorder and causes the cassette to fall into the discharge hopper. The carriage, when returning to the tape recorder, also lowers the next cassette onto the tape recorder. The vertical and horizontal movement of the carriage is achieved by causing the carriage to move within guide slots defined by vertical side plates.

DETAILED DESCRIPTION OF THE INVENTION

Figure 3:
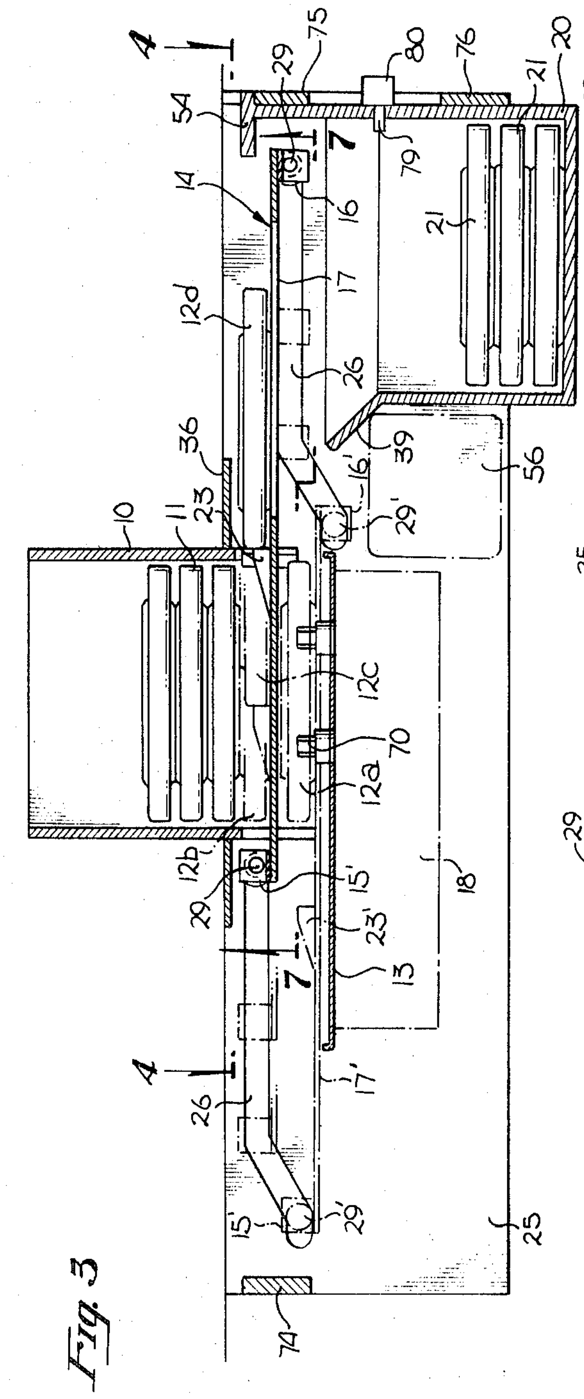
FIG. 3 is a similar view of the changer as FIG. 2 except that the carriage which is engaging a cassette is illustrated in its extreme right position.
Figure 4:
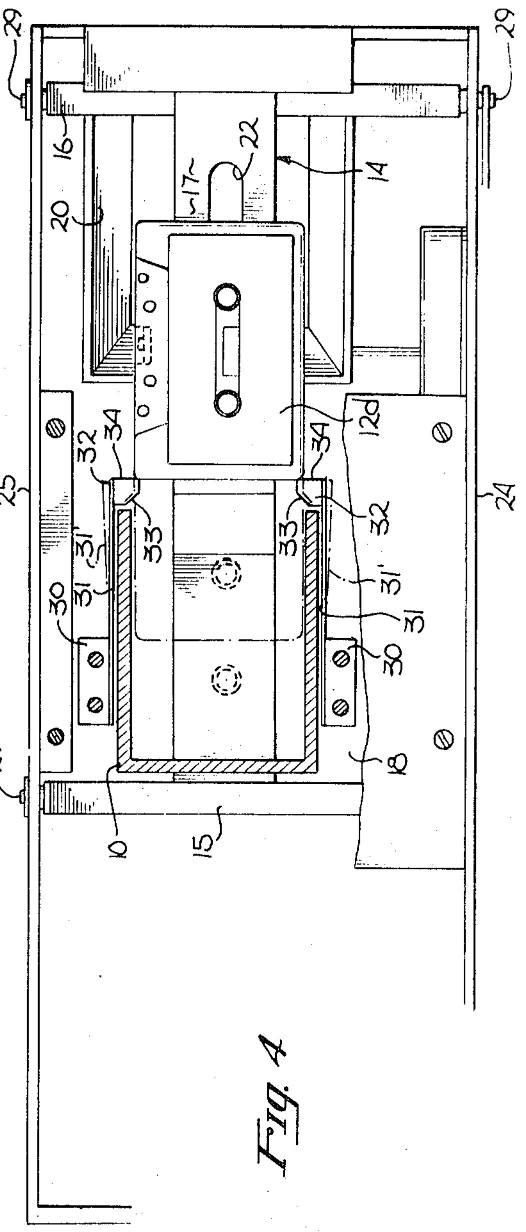
FIG. 4 is a plan view of the changer taken through Section 4—4 of FIG. 3.

The present invention describes an automatic magnetic tape cassette or magazine changer adaptable for automatically and successively placing cassettes on a tape recorder or playback means and for removing said cassettes successively from said tape recorder or playback means. In the present description, a reel-to-reel cassette, that is, a cassette having a supply reel and a take-up reel, such as cassette 11 or cassette 12*d* of FIG. 3 and 4 is illustrated. It will be obvious to one skilled in the art that the cassette changer herein described is adaptable for use with other types of cassettes such as a cassette having a single reel.

Figures 1, 2:
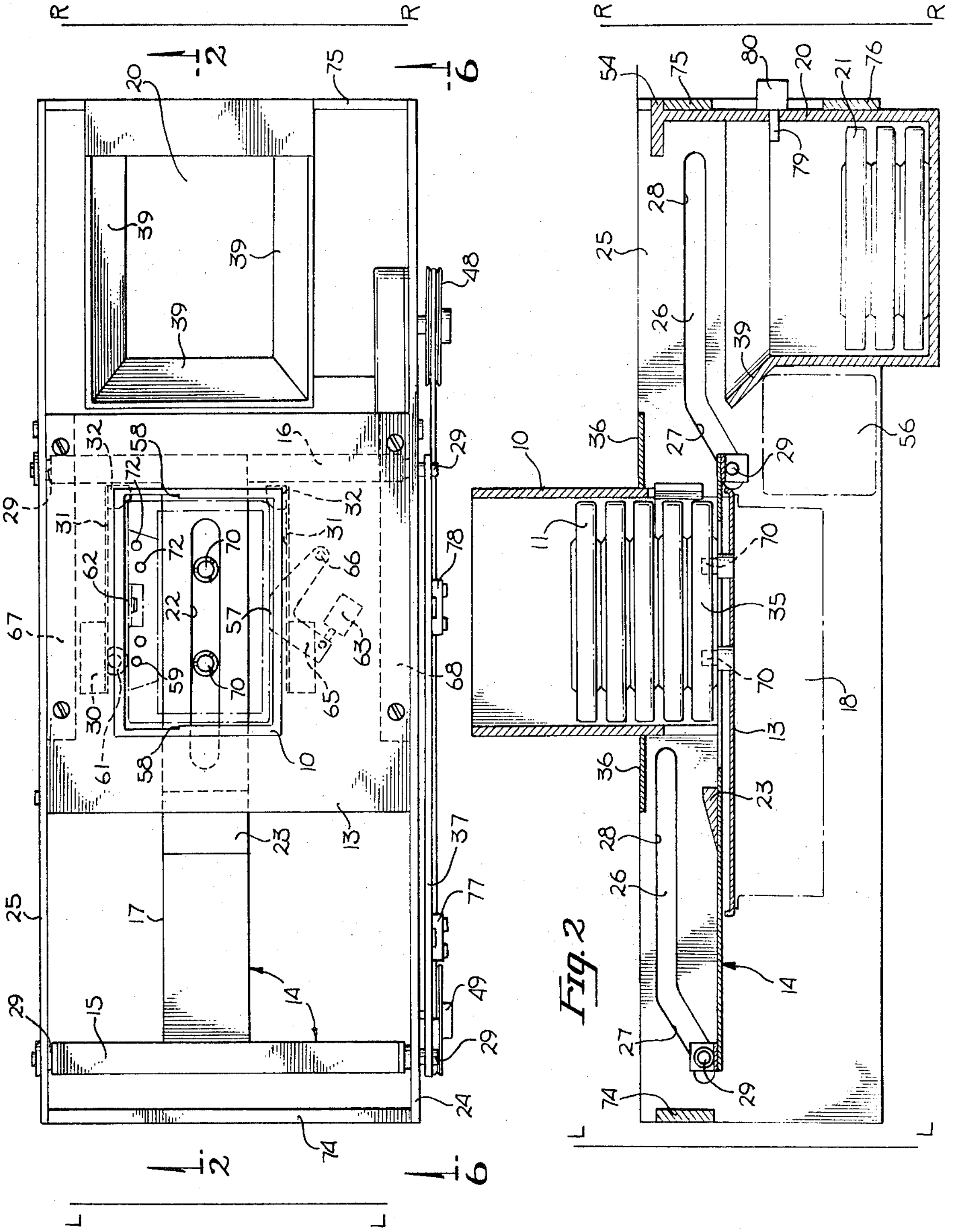
FIG. 1 is a pan view of the cassette changer.
FIG. 2 is a cross-sectional view of the changer taken through Section 2—2 of FIG. 1 with a plurality of cassettes illustrated in the input hopper and discharge hopper.

Referring to FIGS. 1, 2 and 3, a tape recorder 18 having a tape deck 13 is illustrated in conjunction with the changer. The words "tape recorder"as used herein, refer to a device adaptable for recording and/or playing back signals from a magnetic tape. The tape transport mechanism, normally associated with a tape recorder, is contained within tape recorder 18 but not illustrated in order to simplify the present drawings. The tape deck 13, to which the tape recorder 18 is coupled, is rigidly attached to side plates 24 and 25 by means of tape deck support bars 68 and 67, respectively. The tape reel drive shafts 70 which cooperatively engage the reels of the cassette are illustrated in FIG. 3, engaging cassette 12*a*. With reference to FIG. 1, guide pins 72, which may be metal pins rigidly mounted perpendicularly to tape deck 13, cooperatively engage a cassette and align a cassette engaging the tape recorder 18. A tape capstan 59 and an idler wheel 61 which drive the tape across tape head 62, are also illustrated in FIG. 1. As will be explained, the head 62 and idler wheel 61 are mounted on a movable surface and are brought in contact with a cassette engage the tape recorder 18. While only a single tape head 62 is illustrated, the presently disclosed changer may be utilized with a tape recorder having a plurality of heads and where the heads are utilized to record, play back and/or erase signals on and from a magnetic tape. The word "-played"as used herein refers to recording, playing back or erasing signals from or on a magnetic tape.

Figures 6, 7:
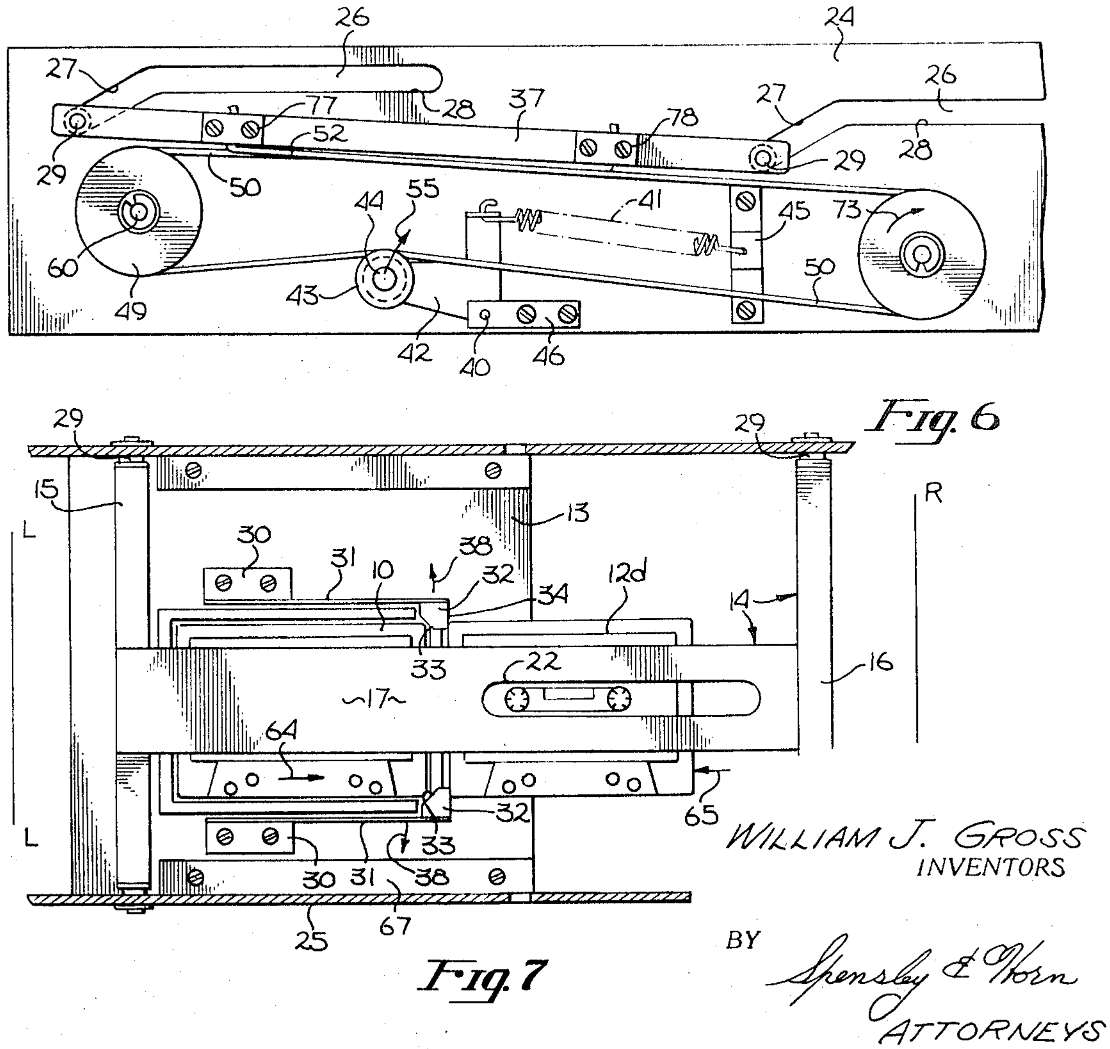
FIG. 6 is a view of the driving mechanism for the carriage taken along Section 6—6 of FIG. 1.
FIG. 7 is a partial bottom view of the changer illustrating a cassette engaging the carriage and stop means taken through Section 7—7 of FIG. 3.

The cassette change comprises an input hopper 10, a carriage 14, a discharge hopper 20, a carriage driving mechanism for driving carriage 14 illustrated in FIG. 6 and a housing. As will be explained in greater detail, the cassettes to be played on tape recorder 18 are placed in the input hopper 10 and are successively placed on the tape deck 13 by the carriage 14 where they may be utilized to record, play back or erase signals. The cassettes are removed from tape deck 13, one at a time, by carriage 14, and discharged into discharge hopper 20.

The various components of the changer are held in their appropriate position by being coupled to a housing. The housing comprises vertical side plates 24 and 25 which are rigidly held parallel to one another by end plate 74 which is disposed between the side plates 24 and 25 at one end of the changer and end plates 75 and 76 which are disposed between side plates 24 and 25 at the other end of the changer. The various members comprising the housing may be made of metal using well known techniques. The entire housing may be enclosed within a case such as a plastic enclosure, in order to add aesthetic appeal to the changer.

Referring to FIGS. 1, 2, 3, 4 and 7, the carriage 14 comprises carriage guide bars 15 and 16, carriage tray 17, catch 23 and guide pins 29. The carriage performs the function of moving the cassette both vertically and horizontally so that a cassette is removed from tape deck 13 and moved to where the cassette may fall into discharge hopper 20. In addition the carriage 14 lowers the next cassette in hopper 10 onto the tape deck 13. The entire carriage 14 moves from the position in which it is illustrated in FIGS. 1 and 2 to its extreme right position as is illustrated in FIGS. 3 and 4. (Note that the right side of the drawing is indicated by line R—R and the left side by line L—L).

Two guide slots 26 as clearly illustrated in FIG. 2, are disposed through and defined by side plate 25. Each guide slot 26 comprises a slanted section 27 which forms an acute angle with the plane defining tape deck 13 and a horizontal section 28 which is substantially parallel to the plane defining tape deck 13. A pair of guide slots 26 identical to those disposed through plate 25 are also disposed through side plate 24, in the same relative positions as are slots 26 of plate 25. Thus, side plates 24 and 25 may be substantially identical insofar as slots 26 are concerned and one slot on one side plate forms an opposite slot with one slot on the other side plate. The guide slots 26 form guides in which the carriage 14 moves. The section 27 of the guide slots 26 defines a path having a vertical and horizontal component for carriage 14 and enables carriage 14 to remove a cassette engaging tape recorder 18 from the tape recorder. (As will be explained, all the cassettes in hopper 10 are lifted when a cassette is removed from the tape recorder 18.) As will be seen, when the carriage 14 moves in the section 27, a cassette engaging the carriage only moves vertically and not horizontally. The length of the slanted section 27 is designed to lift the cassette engaging tape recorder 18 such that the cassette clears pins 72, capstan 59 and shafts 70. The section 28 defines a horizontal path for movement of the carriage 14 in a horizontal plane and permits the carriage to horizontally move a cassette towards discharge hopper 20.

Carriage guide bar 15 is disposed between opposite slots 26 of side plates 24 and 25 as is illustrated in FIGS. 1, 4 and 7. Each end of guide bar 15 contains a guide pin 29 which is adaptable for cooperatively engaging and moving within slots 26. A guide bar 16 which may be identical to guide bar 27 is disposed between the other opposite slots 26 of side plates 24 and 25. Bar 16 also contains guide pins 29 allowing bar 16 to move within the path defined by slots 26. Bars 15 and 16 and guide pins 29 may be ordinary metal parts. Bearing surfaces may be added to guide pins 29 in order that the pins move freely within slots 26. For example, guide pins 29 may be made of Teflon or other material adaptable for reducing the friction between the surface of the guide pins and the surfaces of side plates 24 and 25 defining the slots 26.

Referring to FIGS. 1, 2, 3, 4 and 7, the carriage tray 17 comprises a flat, elongated member disposed between and rigidly coupled to carriage guide bars 15 and 16. The tray 17 is perpendicular to the side plates 24 and 25 and parallel to the direction of movement of the carriage 14. Slot 22, as clearly illustrated in FIG. 7 is disposed through carriage tray 17. The slot 22 is adaptable for allowing the tape reel drive shaft 70 to freely pass through tray 17 and engage the tape reels of a cassette. The entire tray 17 which may be an ordinary metal part, is adaptable for being disposed between tape deck 13 and a cassette engaging and being played on the tape recorder 18. Thus, as illustrated in FIG. 2, when a cassette 35 is being played on tape recorder 18, the tray 17 is disposed between the cassette 35 and the tape deck 13.

A catch 23, having a general wedge shape, is rigidly coupled to the upper surface of tray 17. The catch 23, which may be a plastic or metal part, serves the function of causing a cassette engaging the tray 17 to move horizontally with the tray 17 once the catch 23 abuts the cassette. Referring now to FIG. 2, it may be readily seen that as carriage 14 moves to the right, the cassettes within hopper 10, including the cassette engaging the tape deck 13, will be lifted vertically. Note that before a cassette engaging tape recorder 18 is removed, the head 62 and wheel 61 are moved away from the cassette. The cassette 35 which is engaging the tape recorder 18 will not move to the right initially because it is engaging the shafts 70, pins 72 and capstan 59 of FIG. 1. As the carriage 14 continues to lift the cassettes vertically, the entire carriage 14, including tray 17, will continue to move both vertically and horizontally as the guide pins 29 move within section 27 of the guide slots 26. When the catch 23 engages and abuts cassette 35, the cassette begins to move horizontally with tray 17. At the time when the catch 23 engages the cassette 35, the cassette is clear of all the mechanisms which are part of the tape recorder 18 such as the drive shaft 70, the capstan 59 and the guide pins 72.

The input hopper 10, illustrated in FIGS. 1, 2, 3, 4, 5, and 7, comprises an elongated hollow member having a generally rectangular cross-section. The cross-section of hopper 10 is approximately equal to the shape of a cassette. The hopper 10 is positioned directly above the tape deck 13 such that the cassettes within the hopper are aligned to cooperatively engage the mechanisms of the tape recorder 18. The hopper 10 which is coupled to the changer housing through the support means 36, may be made of metal or plastic utilizing well known techniques. Indexing means are contained within the hopper so that cassettes may be placed within the hopper in a predetermined orientation. The indexing means comprises notches 58, illustrated in FIG. 1, which extend along the inner walls of hopper 10. The notches 58 are made to match equivalent extensions which are standard in some cassettes. Thus, a cassette having extensions which match notches 58, may only be placed in hopper 10 in a predetermined orientation which will align the cassette with the mechanism on tape deck 13.

Discharge hopper 20, illustrated in FIGS. 1, 2, 3 and 5, comprises a generally rectangularly shaped receptacle. The cross-section of hopper 20 is approximately equal to the cross-section of hopper 10 (except that it does not have notches 58) and is adaptable for containing cassettes. Three of the four upper walls 39 of the hopper 20 are outwardly disposed to form a funnel-like means adaptable for catching cassettes, such as cassettes **12*e* and 12*f*, illustrated in FIG. 5. The other wall of the hopper 20 contains a lip 54 which engages plate 75 and partially supports the hopper 20 on the housing of the changer. Other support means not illustrated are utilized to hold the hopper 20 in position within the changer which, as illustrated, is generally below the carriage 14. The hopper 20 is adaptable for being readily removed from the changer so that the cassettes contained within the hopper may be removed. Hopper 20 may contain means for stopping the changer when the discharge hopper 20 is filled. A switch 80 having a switch arm 79 which extends into the interior of hopper 20, may be utilized for this purpose. The switch, which may be mounted to the changer housing, may interrupt the current to motor 56 when a cassette engages the arm 79. Other means may also be sued to indicate, that hopper 20 is filled; for example, a counter which is activated by movement of carriage 14 may be used to stop the changer once the counter has counted a predetermined number which is equal to the number of cassettes that fill hopper 20. The counter may be reset by the removal of the hopper 20. Hopper 20 may be similar in construction to hopper 10** and may be made of plastic or metal using commonly known techniques.

Referring to FIG. 7, a spring stop means which prevents a cassette from moving to the left or towards the input hopper 10 is illustrated. Cassette 12d is illustrated abutting stops 32 and is prevented from moving toward hopper 10 by these stops. The spring stop means comprises support blocks 30, spring strips 31, and stops 32. The support blocks 30, which may be ordinary metal parts, are rigidly coupled to the tape deck 13 and provide support for the spring strip 31. The spring strips 31 are elongated resilient members suitable for maintaining stops 32 in the position illustrated in FIG. 7 but adaptable for allowing the stops 32 to move in the directions indicated by arrow 38. The stops 32 which are rigidly coupled to the ends of spring strips 31 opposite support blocks 30 are wedge-like members having a tapered corner 33 which faces a cassette which is engaging the tape recorder. It is readily apparent from FIG. 7 that as a cassette moves in the direction indicated by arrow 64, it will engage the tapered corners 33 of stops 32, causing the stops to move on the spring strips 31 in the direction indicated by arrows 38. This will allow the cassette to move freely in the direction indicated by arrows 64. Once the cassette moves beyond the flat surface 34 of stops 32, the spring action of spring strips 31 will cause the stops 32 to move in the positions indicated in FIG. 7. A cassette, such as cassette **12*d*, is unable to move in the direction of arrow 65 since the stops do not move when the cassette engages the flat surface 34 of stops 32. Thus, a cassette is able to move away from hopper 10 but is prevented from returning towards hopper 10 by the action of the spring stop means. It is of course within the scope of the present invention to utilize a spring stop means which is part of hopper 10 and which is not directly coupled to tape deck 13**.

Referring to FIGS. 1 and 6, the carriage driving mechanism is coupled to aide plate 24. The carriage driving mechanism moves the carriage 14 in reciprocating motion within the path defined by the guide slots 26. A drive bar 37 interconnects and is disposed between the guide pins 29 at one end of carriage guide bars 15 and 16. The drive bar which may be an ordinary metal member is utilized to transfer the driving force from drive cable 50 to the carriage 14. A drive pulley 48 which may be an ordinary pulley adaptable for cooperatively engaging a drive cable such as drive cable 50 is the source of driving power for the driving mechanism. The pulley 48 is coupled to motor 56, illustrated in FIGS. 2, 3 and 5. Motor 56, an ordinary electrical motor, may be coupled to pulley 48 through commonly known and utilized reduction gears. A cable support pulley 49 is coupled to side plate 24 at the opposite end of the side plate from the drive pulley 48. Pulley 49, an ordinary pulley adaptable for cooperatively engaging drive cable 50, is freely rotatable about its axis 60 on plate 24.

A tensioning mechanism is utilized to maintain the drive cable 50 at a predetermined tension. The mechanism comprises support block 46, plate 42, tensioning wheel 43, bearing 44 and spring 41. The plate 42 which may be an ordinary metal plate, has a generally "L" shape and is pivotally connected at point 40 to support block 46. Support block 46 is rigidly coupled to side plate 24. A spring 41 is coupled between one end of plate 42 and a support bracket 45. The spring 41 which may be an ordinary metal spring, tends to apply tension to the plate 42, causing it to rotate about point 40 in the direction indicated by arrow 55. The freely rotatable tensioning wheel 43 which may be a rubber, plastic or metal wheel, is coupled to the other end of plate 42 by bearing 44. Drive cable 50 may be an ordinary cable and interconnects pulleys 48 and 49, tensioning wheel 43 and drive bar 37. One end of the drive cable 50 is coupled at point 52 to drive bar 37 by an ordinary cable clamp 77. The drive cable then encircles drive pulley 48, is brought in contact with tensioning wheel 43, encircles pulley 49 and is coupled at its other end at point 53 to drive bar 37 by clamp 78. It is readily apparent from FIG. 6 that as pulley 48 rotates in the direction of arrow 73, the drive bar 37 will cause carriage 14 to move toward the right. As the drive bar 37 and carriage 14 begin to move, the slack which develops in the drive cable 50 is taken up by the action of the tensioning mechanism. As any slack occurs in the drive cable 50, spring 41 will cause plate 42 to rotate in the direction of the arrow 55, causing the tension wheel 43 to take up the slack in the cable. As the carriage and the drive bar 37 move toward the right, the tensioning mechanism returns to the position illustrated in FIG. 5 since the tension created in the drive cable 50 resulting from the removal of the slack from the cable is sufficient to overcome the tension on plate 42 caused by spring 41.

Known means not illustrated may be utilized to actuate the driving mechanism and provide a signal causing the motor 56 to drive the carriage 14 from its position illustrated in FIGS. 1 and 2 to the position of the carriage 14, illustrated in FIGS. 3 and 4, and return the carriage to its initial position, as illustrated in FIGS. 1 and 2. Electrical switches placed along the path of carriage 14 or a gear train which causes pulley 48 to rotate in a direction opposite that shown by arrow 73 when the carriage reaches its extreme right position may be utilized to reverse the carriage movement. Signals may be recorded on the tape in the cassette, indicating when a cassette is completed which may be coupled to motor 56 and utilized to initiate the movement of the carriage 14 or known means for sensing that no movement is occuring in the tape may also be utilized.

Referring to FIG. 1, the tape head 62 and idler wheel 61 may be movably coupled to tape deck 13 and brought into contact with a cassette engaging the tape recorder 18, once the cassette has fully engaged the guide pins 72, capstan 59 and tape reel drive shaft 70. A switch, not illustrated, disposed between a cassette engaging the tape deck 13 and the tape deck 13 may be utilized to provide a signal indicating that a cassette is engaging the tape recorder 18. The signal may actuate a mechanism which causes the tape head and idler wheel 61 to move towards the cassette and engage the tape within the cassette. A locking mechanism is illustrated in FIG. 1 and serves the function of holding or locking a cassette engaging the tape recorder 18 on the tape deck 13. An L-shaped lever arm 65 is illustrated pivotally coupled at point 66 to tape deck 13 at one end and also coupled to a solenoid 63 at its other end. The solenoid 63 may be actuated in the same manner as the mechanism for moving the tape head 62 and idler wheel 61. The surface 57 of the lever arm is brought in contact with a cassette by the actuation of solenoid 63 and causes the cassette to remain locked on tape deck 13 while the cassette is being played by the tape recorder 18. The locking mechanism and movable feature of both the idler wheel 61 and tape head 62 may not be necessary with some tape recorders.

With reference to FIGS. 1 and 2, the cassettes or magazines which are to be played on the tape recorder 18 and automatically placed on and removed from the recorder 18 by the changer, are placed in the order in which they are to be played within hopper 10. The cassettes, such as cassette 11, of FIGS. 2 and 3 are placed in the upper end of hopper 10 in an orientation such that the cassettes are properly aligned to cooperatively engage the tape reel drive shaft 70, the tape capstan 59 and guide pins 72. Assuming that the carriage 14 is in the position shown in FIGS. 1 and 2, the first cassette to have been placed within the input hopper 10, will cooperatively engage the tape recorder 18 as illustrated by cassette 35. Thus, the first cassette placed in the hopper 10 may be played on tape recorder 18 without any movement of the carriage 14 provided that the carriage 14 is in its initial position as illustrated in FIGS. 1 and 2. As will be noted, even if the carriage 14 is not in its extreme left position, when it moves into this position, it will lower the first cassette onto the tape recorder 18. A switch may be placed on tape deck 13, which is actuated by a cassette engaging the tape recorder 18, and utilized to apply power to the tape recorder 18.

With reference to FIGS. 3 and 6, cassette 12*a* is illustrated on carriage tray 17′ with the cassette engaging the tape recorder 18. When it is desirous to change the cassette, motor 56 actuates pulley 48. Means such as a signal indicative of the end of the tape in the cassette may be recorded on the tape and utilized to actuate the motor 56. As the pulley 48 begins to turn in the direction of arrow 73, it causes the drive bar 37 to first move in the path defined by the slanted sections 27 of guide slots 26. When this occurs, the cassette 12*a* is lifted to the position illustrated by cassette 12*b*. Note that as the carriage ascends along the slanted section 27 of the guide slots 26, no horizontal movement of the cassette occurs. The reason for this is that the cassette 12*a* is engaging the various mechanisms of the tape recorder 18, such as the capstan 59, guide pins 72 and shafts 70 which prevent horizontal movement of the cassette until the cassette clears these mechanisms. Also note that during the initial movement of a carriage 17 all the cassettes in the input hopper 10, are lifted vertically along with the cassette which was engaging the tape recorder 18.

When the guide pins 29 reach the horizontal section 28 of the guide slots 26, the carriage 17 moves horizontally towards the discharge hopper. During its initial movement in the horizontal direction, the catch 23 abuts and engages the the cassette 12*b*, causing the cassette to move horizontally with the carriage. The catch 23 is illustrated in FIG. 3 in its initial position 23′ and also in its position when it initially engages cassette 12*b*. Cassette 12*c* illustrates the cassette 12*a* and 12*b* as the cassette is being moved horizontally by carriage 17 away from hopper 10. Note that sufficient clearance exists between the lower end of hopper 10 facing hopper 20 and the tray 17 of carriage 14 to allow only a single cassette to be moved horizontally away from hopper 10. Cassette 12*d* is illustrated in a position when the carriage 17 to which it is engaged is moved to its extreme right position. In this position, the guide pins 29 of the carriage 14 are in the extreme right ends of the horizontal sections 28 of the guide slots 26.

With reference to FIG. 4, as the cassette 12 is being moved horizontally away from the hopper 10 and tape recorder 18, the stops 32 allow the cassette to readily pass since the cassette first abuts the tapered corners 33 of the stop means 34 causing them to move to the position indicated by spring strip 31′. Once the cassette 12*d* has cleared the edge of the stops 32, the stops move to their positions indicated in FIG. 7 and prevent the cassette from moving back toward the recorder 18.

Figure 5:
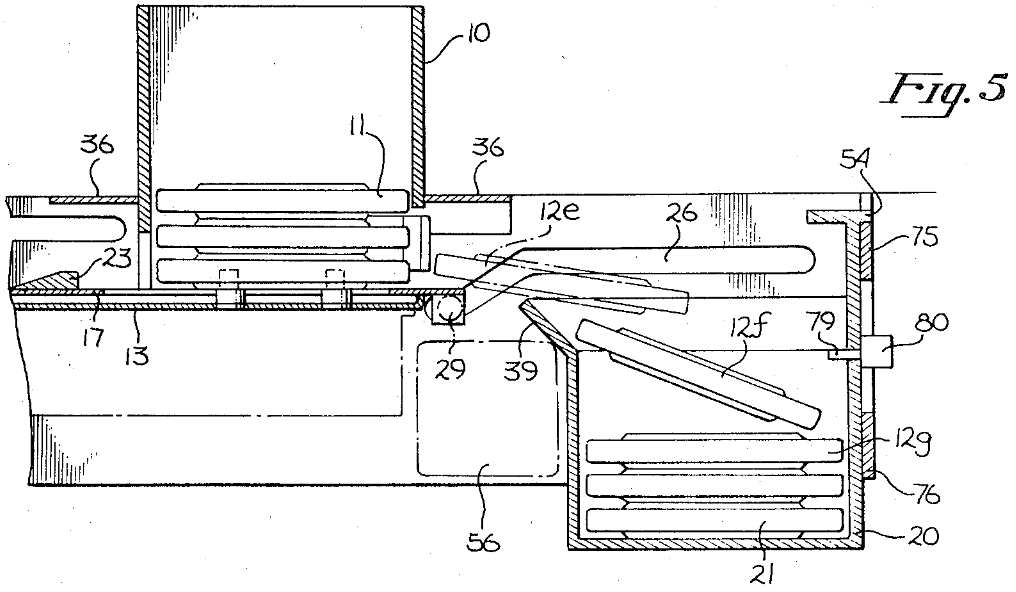
FIG. 5 is a partial view of the changer, similar to FIG. 2 and illustrates the path of a cassette as it enters the discharge hopper.

The driving mechanism of FIG. 6 and motor 56 then move the drive bar 37 and carriage 14 to the left to its initial position, once the carriage 14 has reached this extreme right position. As this occurs, the cassette **12*d* of FIGS. 3, 4 and 7 is prevented from returning towards hopper 10 since the cassette 12*d* engages the flat surfaces 34 of the stops 32. With reference to FIG. 5, as the carriage returns to its initial position, as indicated in FIG. 5, the cassette falls as indicated by the positions of cassettes 12*e*, 12*f* and 12*g* into the discharge hopper 20. The slanted upper walls 39 of the discharge hopper 20 assist in aligning the cassette with the discharge hopper 20** as the cassette falls into the hopper.

As the carriage 14 returns to its initial position, and begins moving down the path defined by the slanted sections 27 of slots 26, the cassette in hopper 10, abutting the tray 17 is lowered vertically onto the tape deck 13 and brought into engagement with tape recorder 18 by the carriage 14.

Thus, an automatic tape cassette changer has been disclosed which utilizes a single carriage for lifting a cassette from a tape recorder, providing horizontal movement of the cassette so that it may be placed in a discharge hopper and for lowering the next cassette onto the tape recorder.

I claim:

1. An automatic tape cassette changer for placing and removing a cassette on a tape recorder or playback means comprising:
   - an input hopper for containing a plurality of cassettes and for positioning said cassettes successively above said tape recorder or playback means;
   - a carriage for imparting vertical and horizontal motion to a cassette, said vertical motion being sufficient to remove said cassette from said recorder or playback means and said horizontal motion being sufficient to remove said cassette from beneath said input hopper;
   - a member defining at least one guide slot, said guide slot determining a path for the reciprocating movement of said carriage and including a horizontal section for providing horizontal motion to said carriage and a slanted section for providing vertical motion to said carriage, said member being coupled to said carriage;
   - a carriage driving means for reciprocally driving said carriage in the path defined by said guide slot;
   - a discharge hopper for receiving cassettes removed from said tape recorder or playback means; and
   - a housing for containing and securing in their relative positions said input hopper, said member, carriage, discharge hopper and carriage driving means;
   - whereby cassettes will be successively placed on said tape recorder or playback means and will be lifted and carried away from said tape recorder or playback means by said carriage.

2. The changer defined in claim 1 containing stop means for preventing a cassette engaging said carriage from moving horizontally toward said tape recorder or playback means but adaptable for allowing said cassette to move horizontally away from said tape recorder or playback means, said stop means being positioned adjacent to said tape recorder or playback means along the path of horizontal movement of a cassette engaging said carriage.

3. The changer defined in claim 2 wherein said discharge hopper houses a plurality of cassettes and is positioned along the path of movement of a cassette on said carriage, such that a cassette on said carriage which is prevented from returning to said recorder or playback means by said stop means enters said discharge hopper.

4. The changer defined in claim 3 wherein said input hopper comprises an elongated hollow member having a generally rectangular cross-section, said cross-section being approximately equal to the shape of a cassette and where said input hopper is positioned above said recorder or playback means with said cross-section of said input hopper being approximately parallel to the recorder or playback means.

5. The changer defined in claim 4 wherein said input hopper contains an indexing means for permitting the cassette to be placed in said hopper in a predetermined orientation.

6. The changer defined in claim 3 wherein said discharge hopper is positioned generally below the level of said carriage such that a cassette which is prevented from returning to said recorder or playback means falls into said discharge hopper.

7. An automatic tape cassette changer for placing and removing a cassette on a tape recorder or playback means comprising:
   - a pair of vertical side plates disposed on each side of said tape recorder or playback means, each side plate defining a pair of guide slots, each having a slanted and horizontal section and where one slot on each side plate forms an opposite slot with one slot on the other side plate;
   - a carriage comprising a pair of bars, each disposed between opposite slots of said side plates and a tray disposed between and coupled to said bars, adaptable for being disposed between said tape recorder and playback means and a cassette engaging said means, where said bars are adaptable for reciprocal movement within said slots;
   - an input hopper for containing a plurality of cassettes and for positioning said cassettes successively above said tape recorder and playback means;
   - a discharge hopper for receiving cassettes removed from said tape recorder or playback means; and
   - driving means for moving said carriage in reciprocal movement within said guide slots;
   - whereby a cassette on said recorder or playback means may be lifted from said means when said carriage is caused to move within the slanted section of said slots and where a cassette on said carriage is horizontally moved from said recorder or playback means when said carriage is caused to move within the horizontal section of said slots.

* * * * *